US008473648B2

(12) United States Patent
Chakhaiyar et al.

(10) Patent No.: US 8,473,648 B2
(45) Date of Patent: Jun. 25, 2013

(54) SYSTEM AND METHOD OF I/O PATH VIRTUALIZATION BETWEEN A RAID CONTROLLER AND AN ENVIRONMENT SERVICE MODULE IN A STORAGE AREA NETWORK

(75) Inventors: Madhukar Gunjan Chakhaiyar, Gaya (IN); Mahmoud K Jibbe, Wichita, KS (US); Dhishankar Sengupta, Yelachanahalli (IN); Himanshu Dwivedi, Bangalore (IN)

(73) Assignee: LSI Corporation, Milpitas, CA (US)

( * ) Notice: Subject to any disclaimer, the term of this patent is extended or adjusted under 35 U.S.C. 154(b) by 251 days.

(21) Appl. No.: 12/969,601

(22) Filed: Dec. 16, 2010

(65) Prior Publication Data

US 2012/0159474 A1    Jun. 21, 2012

(51) Int. Cl.
*G06F 3/00* (2006.01)
*G06F 5/00* (2006.01)
*G06F 13/26* (2006.01)

(52) U.S. Cl.
USPC .................................. 710/48; 710/6; 710/264

(58) Field of Classification Search
USPC .............................................. 710/6, 264, 48
See application file for complete search history.

(56) References Cited

U.S. PATENT DOCUMENTS

| | | | | |
|---|---|---|---|---|
| 5,937,205 A | * | 8/1999 | Mattson et al. | 710/6 |
| 7,337,248 B1 | * | 2/2008 | Rao et al. | 710/53 |
| 7,519,744 B2 | | 4/2009 | Hayashi et al. | |
| 7,856,530 B1 | * | 12/2010 | Mu | 711/119 |
| 2005/0210304 A1 | * | 9/2005 | Hartung et al. | 713/320 |
| 2007/0239944 A1 | | 10/2007 | Rupanagunta et al. | |
| 2008/0104259 A1 | * | 5/2008 | LeFevre et al. | 709/228 |
| 2009/0234987 A1 | | 9/2009 | Lee et al. | |

OTHER PUBLICATIONS

"Solid-state drive—Wikipedia, the free encyclopedia", Jan. 4, 2010, http://web.archive.org/web/20100104043628/http://en.wikipedia.org/wiki/Solid-state_drive.*

* cited by examiner

*Primary Examiner* — Farley Abad
(74) *Attorney, Agent, or Firm* — Prakash Nama; Global IP Services, PLLC (57) ABSTRACT

A system and method of I/O path virtualization between a RAID controller and an environment service module (ESM) in a storage area network (SAN) is disclosed. In one embodiment, a type of I/O request is identified by an input/output (I/O) control engine upon receiving an I/O request from a host computer via a RAID controller. Further, a priority is assigned to the received I/O request based on the type of I/O request by the I/O control engine. Furthermore, the processing of the prioritized I/O request is interrupted by the I/O control engine. In addition, the prioritized I/O request is separated into a command I/O request or a status request. Also, the separated command I/O request or the status request is sent to an associated queue in a plurality of solid state drive (SSD) buffer queues (SBQ) in the I/O control engine.

18 Claims, 7 Drawing Sheets

SYSTEM AND METHOD OF I/O PATH VIRTUALIZATION BETWEEN A RAID CONTROLLER AND AN ENVIRONMENT SERVICE MODULE IN A STORAGE AREA NETWORK

FIELD OF TECHNOLOGY

Embodiments of the present subject matter relate to the field of input/output (I/O) communications between initiators and targets in a storage area network (SAN). More particularly, embodiments of the present subject matter relate to I/O path virtualization between redundant array of independent disks (RAID) controller and an environment service module (ESM) in a SAN.

BACKGROUND

In an existing storage area network (SAN), input/output (I/O) requests between host computers and disk drives are routed via redundant array of independent disks (RAID) controller to a drive tray and then to respective disk drive through a Switch-on-Chip (SOC) channel in the drive tray. These I/O requests are processed in a First in, First out (FIFO) order. Further, the read, write and status requests are not distinguished and/or prioritized and therefore, the I/O requests coming from critical applications may be delayed. As the number of I/O requests increases with the size of the SAN infrastructure, there may be significant reduction in performance of data functions, due to latency in data commitment, deadlocks in the drive tray and resulting I/O bottlenecks. Further, most of the major bottlenecks in a SAN are at the drive backend because of increased and saturated I/O paths. Most of the existing solutions virtualizes around the host, network switch, and interface between host and the SAN.

SUMMARY

System and method of I/O path virtualization between a RAID controller and an environment service module (ESM) in a SAN is disclosed. According to one aspect of the present subject matter, a method includes identifying a type of I/O request by an input/output (I/O) control engine upon receiving an I/O request from a host computer via a RAID controller. Further, a priority is assigned to the received I/O request, based on the type of I/O request, by the I/O control engine. Furthermore, the processing of the prioritized I/O request is interrupted by the I/O control engine. In addition, the prioritized I/O request is separated into a command I/O request or a status request. Also, the separated command I/O request or the status request is sent to an associated queue in a plurality of solid state drive (SSD) buffer queues (SBQ) in the I/O control engine.

According to another aspect of the present subject matter, a non-transitory computer-readable storage medium for I/O path virtualization between a RAID controller and an ESM in a SAN has instructions that, when executed by a computing device causes the computing device to perform the method described above.

According to yet another aspect of the present subject matter, a SAN comprises one or more host computers and an ESM. Further, the ESM comprises an I/O control engine including a plurality of SBQs and one or more drive trays that includes disk drives coupled to the I/O control engine. Furthermore, a RAID controller is coupled between the one or more host computers and the ESM. In one embodiment, the I/O control engine identifies a type of I/O request upon receiving an I/O request from one of the one or more host computers.

Further, the I/O control engine assigns a priority to the received I/O request based on the type of I/O request. Furthermore, the I/O control engine interrupts processing of the prioritized I/O request. In addition, the I/O control engine separates the prioritized I/O request into a command I/O request or a status request. Moreover, the I/O control engine sends the command I/O request or status request to associated queues in the plurality of SBQs in the I/O control engine.

The methods and systems disclosed herein may be implemented in any means for achieving various aspects, and other features will be apparent from the accompanying drawings and from the detailed description that follow.

BRIEF DESCRIPTION OF THE DRAWINGS

Various embodiments are described herein with reference to the drawings, wherein.

DETAILED DESCRIPTION

System and method of input/output (I/O) path virtualization between a redundant array of independent disks (RAID) controller and an environment service module (ESM) in a storage area network (SAN) is disclosed. In the following detailed description of the embodiments of the present subject matter, reference is made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

Figure 1:
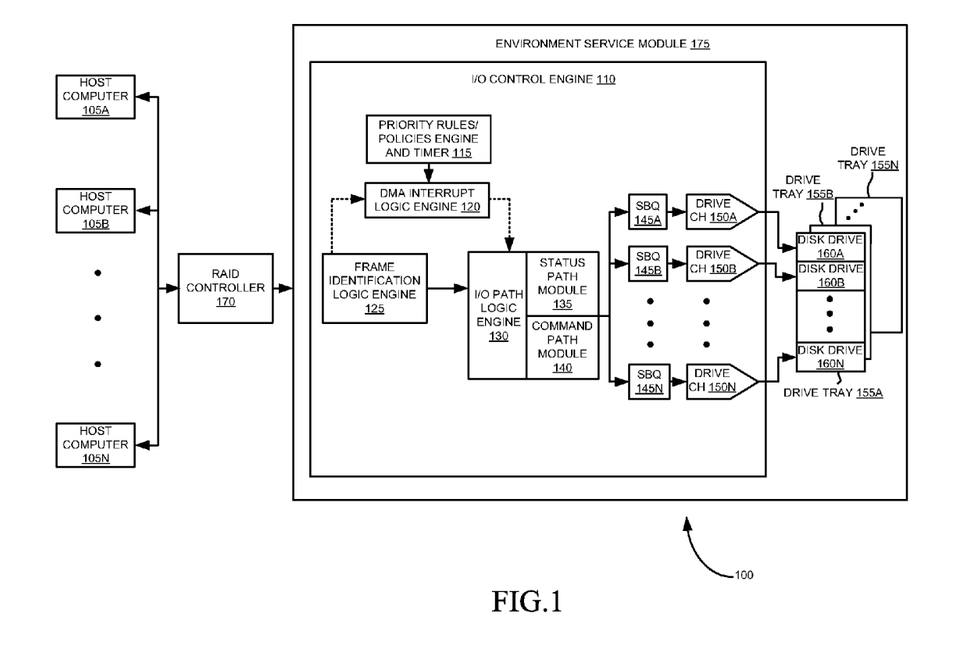
FIG. 1 illustrates a block diagram of a storage area network (SAN), for I/O path virtualization between a RAID controller and an environment service module (ESM), including major components, according to one embodiment.

FIG. 1 illustrates a block diagram of the SAN 100, for I/O path virtualization between a RAID controller 170 and an ESM 175, including major components, according to one embodiment. Particularly, FIG. 1 illustrates the RAID controller 170 coupled between one or more host computers 105A-N and the ESM 175. Further, the ESM 175 includes an input/output (I/O) control engine 110 and a plurality of drive trays 155A-N.

The I/O control engine 110 further includes a frame identification logic engine 125, a priority rules/policies engine and timer 115 and a direct memory access (DMA) interrupt logic engine 120. Further, the DMA interrupt logic engine 120 is coupled to the priority rules/policies engine and timer 115 and the frame identification logic engine 125. Furthermore, the I/O control engine 110 includes an I/O path logic engine 130 coupled to the frame identification logic engine 125 and the DMA interrupt logic engine 120.

In addition, the I/O control engine 110 includes a status path module 135 and a command path module 140 coupled to the I/O path logic engine 130. Further, the status path module 135 and the command path module 140 are communicatively coupled to a plurality of solid state drive (SSD) buffer queues (SBQ) 145A-N and associated drive channels (CH) 150A-N. Furthermore, the plurality of drive trays 155A-N is coupled to the associated drive CH 150A-N. In addition, the drive trays 155A-N includes a plurality of disk drives 160A-N. For example, the disk drives 160A-N may include the actual physical drives that store the data.

In operation, the host computers 105A-N may send I/O requests to the ESM 175 via the RAID controller 170. In the ESM 175, the I/O requests are received by the frame identification logic engine 125. Further, the frame identification logic engine 125 identifies a type of I/O request received. This is explained in greater detail with reference to FIG. 2. Furthermore, a priority is assigned to the I/O request by the priority rules/policies engine in the priority rules/policies engine and timer 115 based on the type of I/O request. In one embodiment, the priority assigned is based on predefined priority rules/policies and a host I/O time out. In addition, the DMA interrupt logic engine 120 interrupts the processing of the prioritized I/O request based on the type of I/O request. This is explained in greater detail with reference to FIG. 3.

The I/O path logic engine 130 separates the prioritized I/O request into a status request or a command I/O request. The status request and the command I/O request are sent to the status path module 135 and the command path module 140, respectively, for further processing. This is explained in more detail with reference to FIGS. 4 and 5. Further, the status request and the command I/O request are sent to the associated queue in the plurality of SBQs 145A-N. In one embodiment, the SBQs 145A-N may buffer the status request and the command I/O request and also facilitates in faster processing of the I/O requests. Furthermore, the status request and the command I/O request are forwarded to the associated disk drives 160A-N in the associated drive trays 155A-N via the drive CHs 150A-N.

Figure 2:
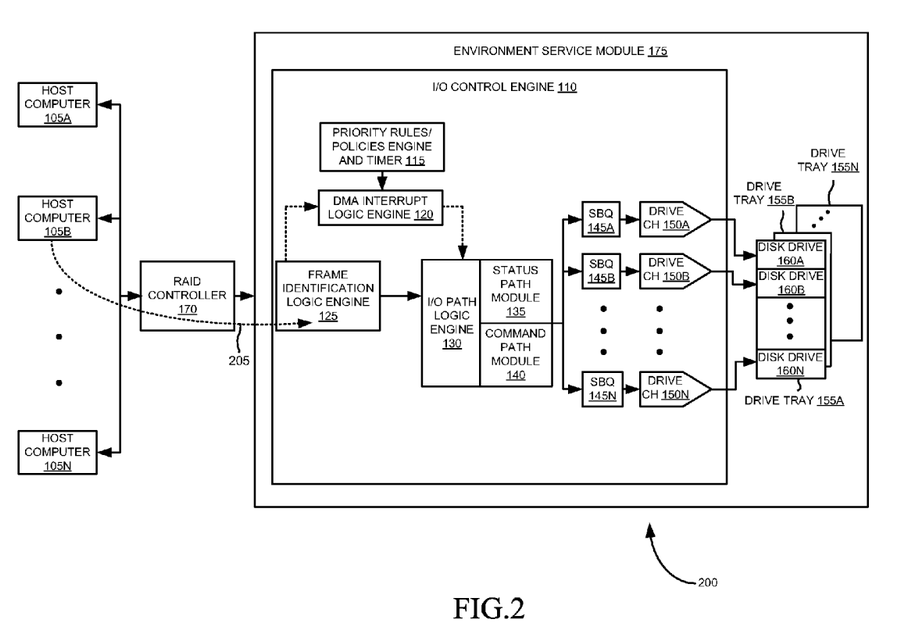
FIGS. 2 and 3 are block diagrams of the SAN, shown in FIG. 1, illustrating sequentially receiving an I/O request from a host computer via the RAID controller and processing and forwarding the received I/O request to an I/O path logic engine, according to one embodiment.
Figure 3:
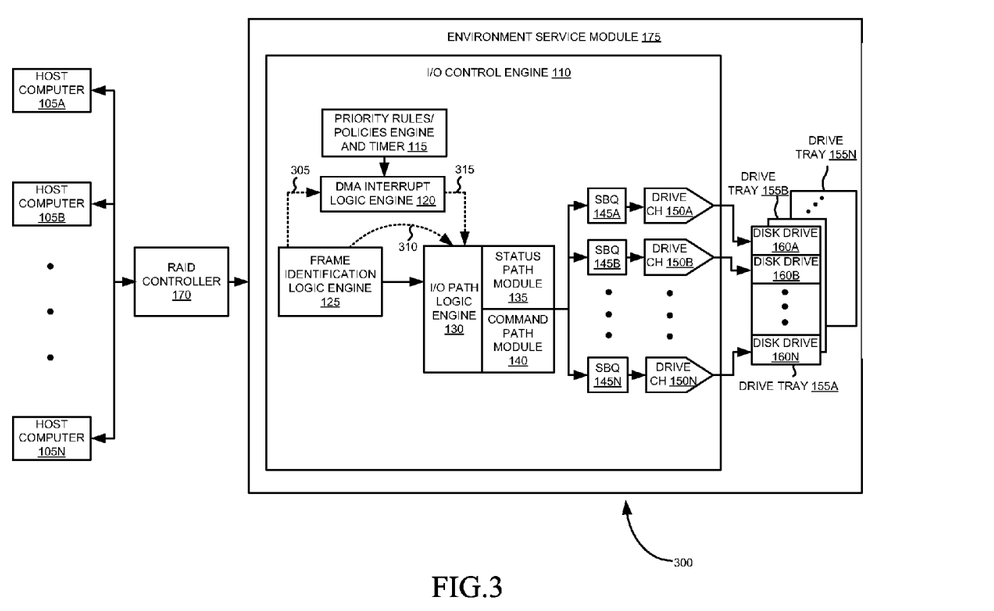

FIGS. 2 and 3 are block diagrams of the SAN 100, shown in FIG. 1, illustrating sequentially receiving an I/O request from a host computer via the RAID controller 170 and processing and forwarding the received I/O request to the I/O path logic engine 130, according to one embodiment. Particularly, FIG. 2 illustrates receiving an I/O request from one of the one or more host computers 105A-N by the frame identification logic engine 125, via the RAID controller 170, as represented by 205. In one embodiment, the frame identification logic engine 125 identifies the type of I/O request received. Exemplary I/O request include a data read I/O request, a data write I/O request, a read status request, a write status request and the like.

Further, the I/O request is sent to the I/O path logic engine 130 for further processing. Furthermore, the information regarding the identified type of I/O request is sent to the DMA interrupt logic engine 120 for assigning a priority to the I/O request. This is explained in more detail with reference to FIG. 3.

As illustrated in FIG. 3, the I/O request is forwarded from the frame identification logic engine 125 to the I/O path logic engine 130, as shown by the path 310. The information regarding the identified type of I/O request is sent to the DMA interrupt logic engine 120, as shown by the path 305. Further, a priority is assigned to the received I/O request based on the type of I/O request. In one embodiment, the priority is assigned to the I/O request by the priority rules/policies engine and timer 115.

In one example embodiment, the priority is assigned to the I/O request based on the predefined priority rules/policies. The predefined priority rules/policies are stored as a look-up table in the priority rules/policies engine and timer 115. The priority rules/policies are configurable by a user based on an application running on the host computers 105A-N and/or the workload of the host computers 105A-N. Further, the user can choose to define different priority rules/policies for a write intensive application and a read intensive application. Also in these embodiments, different priorities can be defined for different drive trays 155A-N.

Further, the timer in the priority rules/policies engine and timer 115 keeps track of the host I/O time out value associated with the I/O requests. In operation, the timer starts when the I/O request is received by the I/O control engine 110. In one embodiment, the timer keeps track of the host I/O time out value and the actual time taken for processing the I/O request. If the time taken to process the I/O request is reaching the predefined host I/O time out threshold value, the I/O request is given the highest priority irrespective of the priority assigned based on the priority rules/policies, defined by the user. This is explained in more detail with reference to FIG. 4. Furthermore, if the host I/O time out value of the I/O request is not reaching the predefined host I/O time out threshold value, it is determined whether the priority assigned to the I/O request has a higher priority.

In one embodiment, based on the priority rules/policies look-up table it is determined if the I/O request has a higher priority. For example, if the I/O request has a higher priority, the DMA interrupt logic engine 120 interrupts the processing of the prioritized I/O requests using an interrupt signal or process signal, as shown by the path 315 in FIG. 3. Further in this embodiment, the I/O path logic engine 130 interprets the interrupt signal or the process signal for the I/O request for faster processing. This is explained in more detail with reference to FIGS. 4 and 5. Furthermore, the I/O request is sent to the associated disk drives 160A-N in the drive trays 155A-N via the plurality of SBQs 145A-N.

Figure 4:
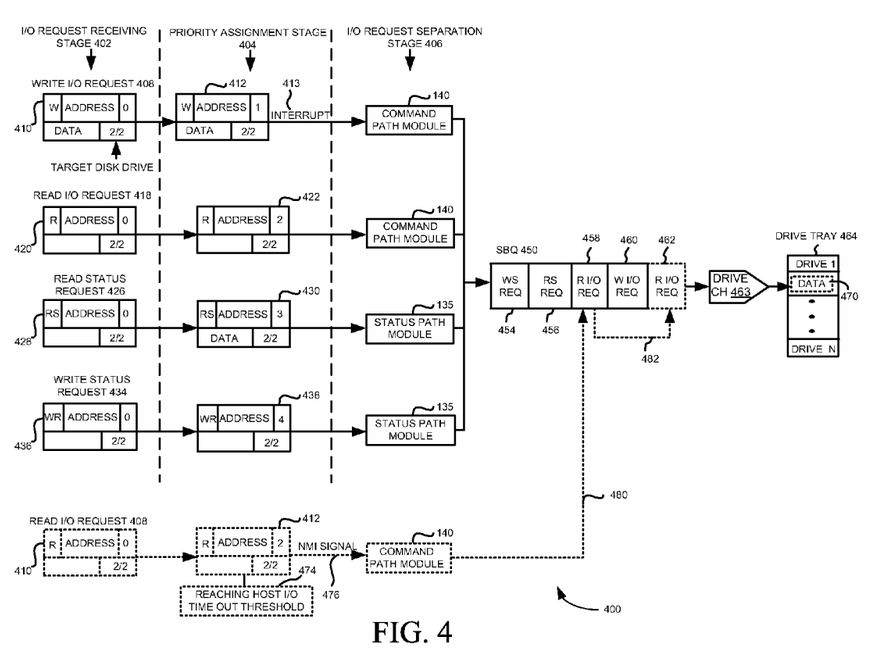
FIG. 4 illustrates the process of prioritizing and queuing the received I/O requests based on priority rules/policies and host I/O time out value, according to one embodiment.

FIG. 4 illustrates the process of prioritizing and queuing the received I/O requests based on priority rules/policies and timer, according to one embodiment. Particularly, FIG. 4 illustrates an I/O request receiving stage 402, a priority assignment stage 404 and an I/O request separation stage 406. In one example embodiment, a write I/O request (W I/O REQ) 408 may be received from one of the one or more host computers 105A-N in the I/O request receiving stage 402. The W I/O REQ 408 includes an I/O frame 410 that further includes information, such as type of I/O request, destination address into which the data may be written, the actual data to be written, and the target disk drive. For example, the target disk drive number can be in the format drive tray number/disk drive number. The priority of the W I/O REQ 408 when it is received may be '0'. Based on the priority rules/policies, the priority rules/policies engine in the priority rules/policies engine and timer 115 assigns a priority of value '1' to the W I/O REQ 408 in I/O frame 412, in the priority assignment stage 404.

Further in this embodiment, based on the priority assigned, the DMA interrupt logic engine 120 generates an interrupt signal 413, as explained in more detail with reference to FIG. 3. Furthermore, the W I/O REQ 408 is identified as a command I/O request and is transferred to the command path module 140 by the I/O path logic engine 130. This is explained in greater detail with reference to FIG. 5. The W I/O REQ 408 is further transferred to the SBQ 450 associated with the target disk drive. Furthermore, the W I/O REQ 408 is placed in the front of the queue at position 460 for further processing.

In another example embodiment, a read I/O request (R I/O REQ) 418 is received from one of the one or more host computers 105A-N in the I/O request receiving stage 402. The R I/O REQ 418 includes an I/O frame 420 that further includes information, such as the type of I/O request, the destination address from which the data is read and the target disk drive. Based on the priority rules/policies, the priority rules/policies engine in the priority rules/policies engine and timer 115 assigns a priority of value '2' to the R I/O REQ 418 in I/O frame 422, in the priority assignment stage 404. Further, the R I/O REQ 418 is identified as a command I/O request and is transferred to the command path module 140 by the I/O path logic engine 130. The R I/O REQ 418 is further transferred to the SBQ 450 associated with the target disk drive. Furthermore, the R I/O REQ 418 is placed at position 458, in the SBQ 450, behind the W I/O REQ 408 for further processing.

In yet another example embodiment, a read status request (RS REQ) 426 is received from one of the one or more host computers 105A-N in the I/O request receiving stage 402. The RS REQ 426 includes a frame 428 that further includes information, such as the type of I/O request, the destination address and the target disk drive. Based on the priority rules/policies, the priority rules/policies engine in the priority rules/policies engine and timer 115 assigns a priority of value '3' to the RS REQ 426 in frame 430, in the priority assignment stage 404. Further, the RS REQ 426 is identified as a status request and is transferred to the status path module 135 by the I/O path logic engine 130. The RS REQ 426 is further transferred to the SBQ 450 associated with the target disk drive. Furthermore, the RS REQ 426 is placed at position 456, in the SBQ 450, behind the R I/O REQ 418 for further processing.

In yet another example embodiment, a write status request (WS REQ) 434 is received from one of the one or more host computers 105A-N in the I/O request receiving stage 402. The WS REQ 434 includes a frame 436 that further includes information, such as the type of I/O request, the destination address and the target disk drive. Based on the priority rules/policies, the priority rules/policies engine in the priority rules/policies engine and timer 115 assigns a priority of value '4' to the WS REQ 434 in frame 438, in the priority assignment stage 404. Further, the WS REQ 434 is identified as a status request and is transferred to the status path module 135 by the I/O path logic engine 130. The WS REQ 434 is further transferred to the SBQ 450 associated with the target disk drive. Furthermore, the WS REQ 434 is placed at position 454, in the SBQ 450, behind the RS REQ 426 for further processing.

In operation, the I/O requests in the SBQ 450 are processed from the front of the queue. The I/O requests are further transferred to the respective target disk drive via the associated drive channel (CH) 463. Meanwhile, if the timer in the priority rules/policies engine and timer 115 indicates that the host I/O time out value for the R I/O REQ 408 is reaching the predefined host I/O time out threshold value, a non-maskable interrupt (NMI) signal 476 is generated by the DMA interrupt logic engine 120. Further, irrespective of the priority assigned to the R I/O REQ 408 based on the priority rules/policies, the R I/O REQ 408 is transferred to the front of the queue, to position 462 from position 458. Furthermore, the R I/O REQ 408 is processed before the host I/O time out value expires and the data is read from the associated disk drive 470, via the associated drive CH 463.

Figure 5:
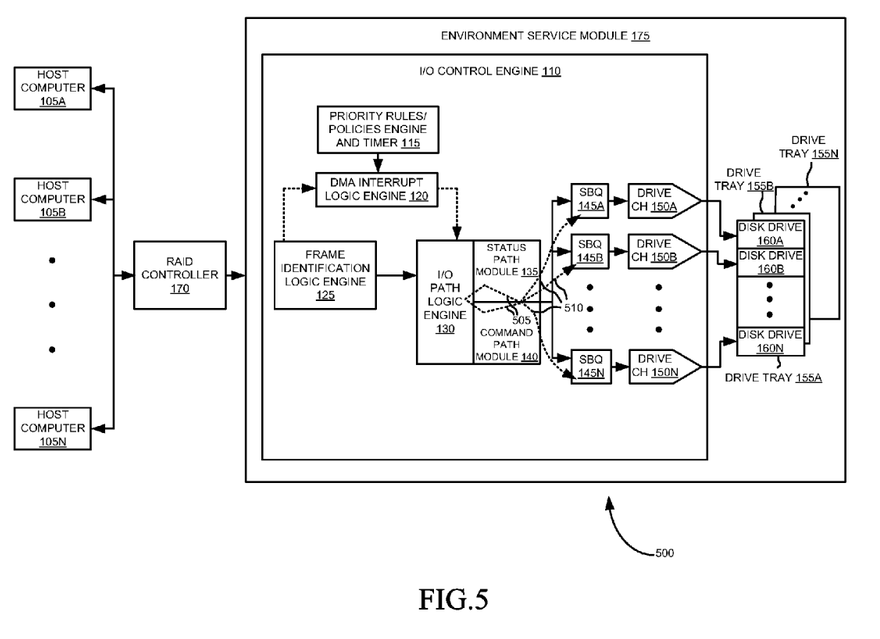
FIG. 5 is a block diagram of the SAN, shown in FIG. 1, illustrating the process of prioritizing the I/O requests using split path architecture and buffering the processed I/O requests in solid state drive (SSD) buffer queues (SBQ) and placing them on the drive channel of the drive trays, according to one embodiment.

FIG. 5 is a block diagram of the SAN 100, shown in FIG. 1, illustrating the process of prioritizing the I/O requests using split path architecture and buffering the processed I/O requests in SBQ 145A-N and placing them on the drive channel 150A-N of the drive trays 155A-N, according to one embodiment. Particularly, FIG. 5 illustrates separating the prioritized I/O requests into the command I/O request or the status request. In one embodiment, the command I/O request includes a read I/O request, a write I/O request and the like. Exemplary status request includes an acknowledgement request, a status request, an error recovery level request and so on.

Furthermore, the status requests are transferred to the status path module 135 and the command I/O requests are transferred to the command path module 140 for further processing, as shown by path 505. The status requests and the command I/O requests are then sent to an associated queue in the plurality of SBQs 145A-N in the I/O control engine 110, as shown by path 510. Further, the I/O requests are committed on the respective disk drives 160A-N in the associated drive trays 155A-N via the associated drive CH 150A-N.

Figure 6:
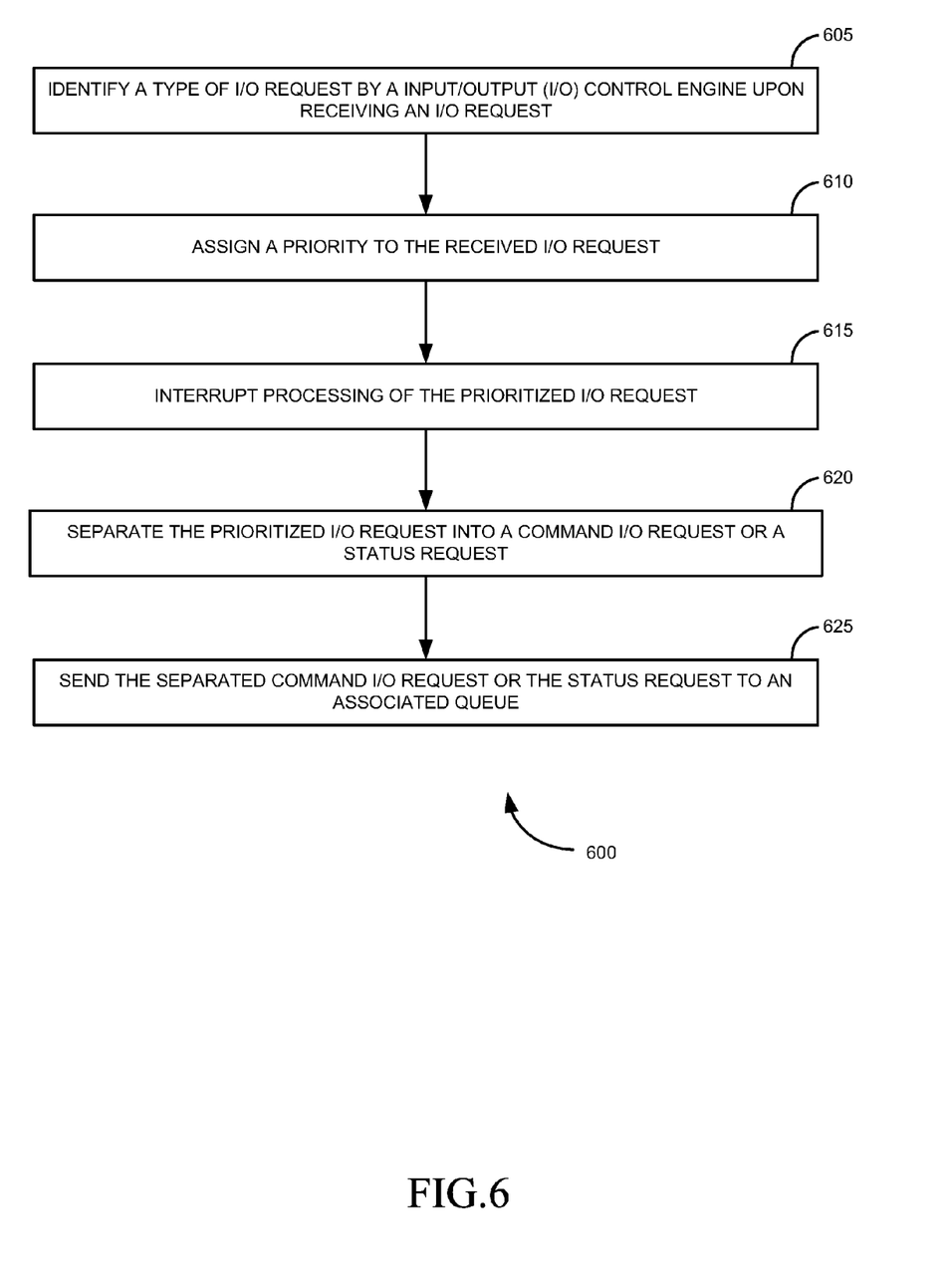
FIG. 6 illustrates a method of I/O path virtualization between the RAID controller and the ESM in the SAN, according to one embodiment.

FIG. 6 illustrates a method of I/O path virtualization between the RAID controller and the ESM in a SAN, according to one embodiment. In block 605, the type of I/O request is identified by the I/O control engine upon receiving the I/O request from the host computer via the RAID controller. This is explained in more detail with reference to FIG. 2. In block 610, a priority is assigned to the received I/O request by the I/O control engine. Further, the priority is assigned based on the type of I/O request. In one embodiment, the priority is assigned to the received I/O request based on priority rules/policies that are configurable by a user as a function of application or workload. This is explained in more detail with reference to FIG. 3.

In block 615, the processing of the prioritized I/O request is interrupted by the I/O control engine. In one embodiment, it is determined whether the host I/O time out value associated with the received I/O request is substantially close to a predefined host I/O time out threshold value by the I/O control engine. Further, if the host I/O time out value is not substantially close to a predefined host I/O time out threshold value, the processing of the prioritized I/O request is interrupted by the I/O control engine. Furthermore, if the host I/O time out value is substantially close to a predefined host I/O time out threshold value, the prioritized I/O request is sent to the associated disk drive in a drive tray via the plurality of SBQs for execution by the I/O control engine.

In another embodiment, it is determined whether the assigned priority to the received I/O request has a higher priority. Further, it is determined whether the assigned priority to the received I/O request has a higher priority based on a look-up table by the I/O control engine. If the assigned priority is higher priority, the prioritized I/O request is sent to an associated disk drive in the drive tray via the plurality of SBQs for execution by the I/O control engine. If the assigned priority is not the higher priority, the command I/O request or status request is sent to queue in an associated one of the plurality of SBQs by the I/O control engine. This is explained in greater detail with reference to FIGS. 4 and 5.

In block 620, the prioritized I/O request is separated into the command I/O request or the status request. In one embodiment, the command I/O request comprises I/O request selected from the group consisting of the read I/O request and the write I/O request. Further, the status request comprises I/O request selected from the group consisting of the acknowledge request, the status request, and the error recovery level request. In block 625, the separated command I/O request or the status request are sent to the associated queue in a plurality of SBQ in the I/O control engine. This is explained in greater detail with reference to FIG. 5.

Figure 7:
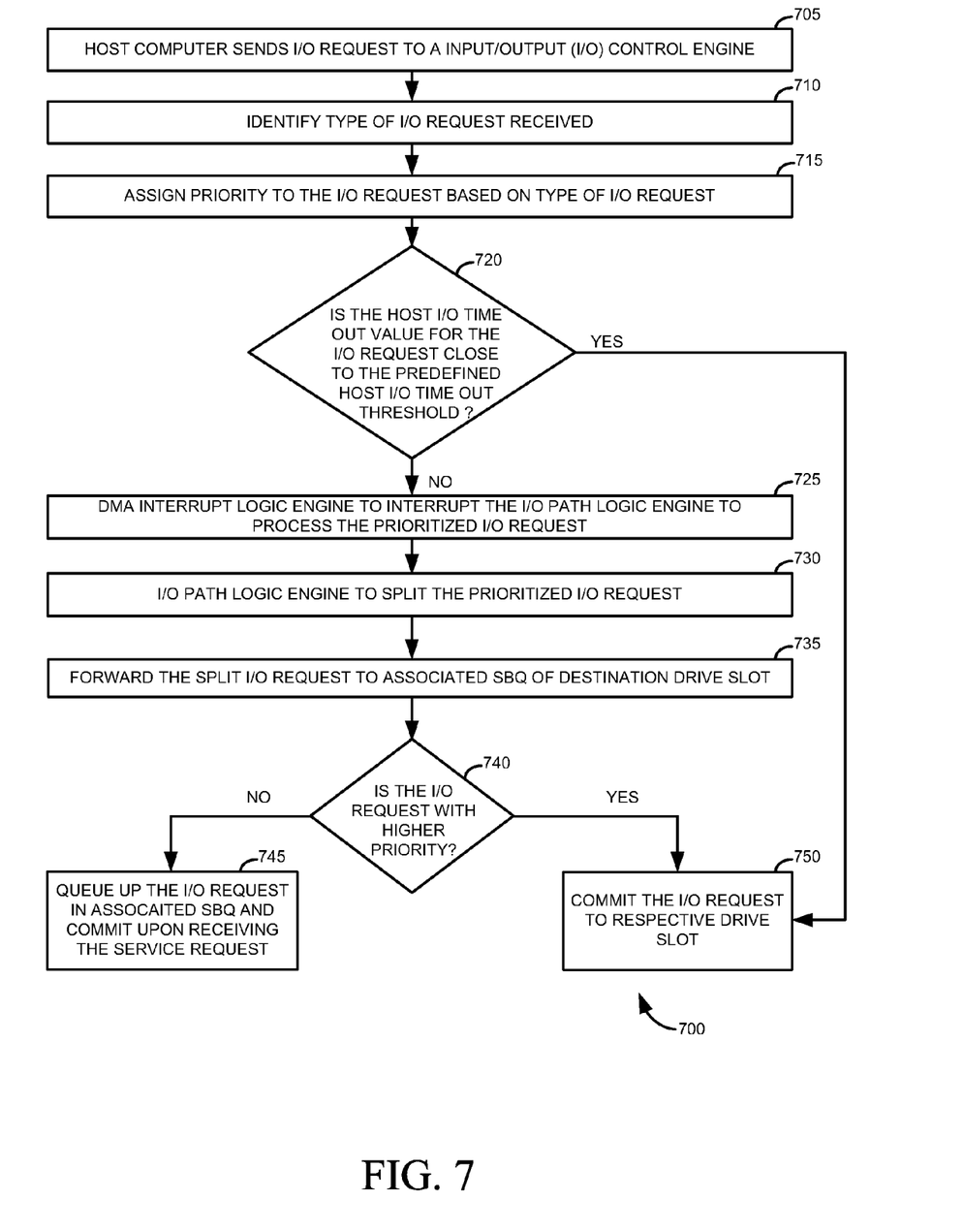
FIG. 7 illustrates a flowchart of a method of I/O path virtualization between the RAID controller and the ESM in the SAN, according to one embodiment; and The drawings described herein are for illustration purposes only and are not intended to limit the scope of the present disclosure in any way.

FIG. 7 illustrates a flowchart 700 of a method of I/O path virtualization between the RAID controller and the ESM in the SAN, according to one embodiment. In block 705, the host computer sends an I/O request to the I/O control engine. This is explained in more detail with reference to FIG. 2. In block 710, the type of I/O request received is identified. This is similar to block 605 in FIG. 6. In block 715, a priority is assigned to the I/O request based on the type of the I/O request. In one embodiment, the priority may be assigned based on the predefined priority rules/policies. This is explained in greater detail with reference to FIG. 3.

In block 720, a check is made to determine whether the host I/O time out value for the I/O request is close to the predefined host I/O time out threshold. If the host I/O time out value for the I/O request is close to the predefined host I/O time out threshold, in block 750, the I/O request is committed to the respective disk drive. If the host I/O time out value for the I/O request is not close to the predefined host I/O time out threshold, in block 725, the DMA interrupt logic engine interrupts the I/O path logic engine to process the prioritized I/O request. This is explained in more detail with reference to FIG. 4.

In block 730, the I/O path logic engine splits the prioritized I/O request. In one embodiment, the prioritized I/O requests are split into the status request and the command I/O request. In block 735, the split I/O request is forwarded to the associated SBQ of the destination disk drive. In block 740, a check is made to determine whether the I/O request is with higher priority. If the I/O request is with higher priority, the process flow 700 performs in step in block 750, as explained above. If the I/O request is not with higher priority, in block 745, the I/O request is queued up in the associated SBQ and is committed upon receiving the service request. This is explained in m detail with reference to FIG. 5.

In various embodiments, the systems and methods described in FIGS. 1 through 7 enables faster processing of the I/O requests by eliminating the bottleneck of the I/O requests on the I/O control engine. The I/O bottlenecks can be further reduced with the use of the SBQs that are dedicated for each disk drive. Further, the systems and methods described in FIGS. 1 through 7 improve the I/O performance and the system performance. The split path architecture makes it easier to manage the I/O traffic and route the I/O requests at a higher speed via the SBQs.

Although, the above example embodiments describe the present subject matter using a RAID controller, one can envision using the example embodiments with any other expansion methods/models behind a storage array controller, such as SAN controller and the like.

Further, even though the present embodiments have been described with reference to specific example embodiments, it will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A method for I/O path virtualization between a RAID controller and an environment service module (ESM) in a storage area network (SAN), comprising:
   identifying a type of I/O request by an input/output (I/O) control engine upon receiving an I/O request from a host computer via a RAID controller;
   assigning a priority to the received I/O request based on the type of I/O request by the I/O control engine;
   interrupting processing of the prioritized I/O request by the I/O control engine, wherein interrupting the processing of the prioritized I/O request comprises:
      determining whether a host I/O time out value associated with the received I/O request is close to a predefined host I/O time out threshold value by the I/O control engine;
      if so, sending the prioritized I/O request to an associated disk drive in a drive tray via a plurality of solid state drive (SSD) buffer queues (SBQs) for execution by the I/O control engine; and
      if not, interrupting processing of the prioritized I/O request by the I/O control engine;
   separating the prioritized I/O request into a command I/O request or a status request; and
   sending the separated command I/O request or the status request to an associated queue in the plurality of SBQs in the I/O control engine.

2. The method of claim 1, wherein assigning the priority to the received I/O request based on the type of I/O request comprises:
   assigning the priority to the received I/O request based on priority rules/policies that are configurable by a user as a function of application and/or workload.

3. The method of claim 1, further comprising:
   determining whether the assigned priority to the received I/O request has a higher priority;
   if so, sending the prioritized I/O request to the associated disk drive in the drive tray via the plurality of SBQs for execution by the I/O control engine; and
   if not, sending the command I/O request or status request to queue in an associated one of the plurality of SBQs by the I/O control engine.

4. The method of claim 3, wherein determining whether the assigned priority to the received I/O request has a higher priority, comprises:
   determining whether the assigned priority to the received I/O request has a higher priority based on a look-up table by the I/O control engine.

5. The method of claim 1, wherein the command I/O request comprises I/O request selected from the group consisting of a read I/O request and a write I/O request.

6. The method of claim 1, wherein the status request comprises I/O request selected from the group consisting of an acknowledge request, a status request, and an error recovery level request.

7. A non-transitory computer-readable storage medium for I/O path virtualization between a RAID controller and an environment service module (ESM) in a storage area network (SAN), having instructions that, when executed by a computing device causes the computing device to:
   identify a type of I/O request by an input/output (I/O) control engine upon receiving an I/O request from a host computer via a RAID controller;
   assign a priority to the received I/O request based on the type of I/O request by the I/O control engine;
   interrupt processing of the prioritized I/O request by the I/O control engine, wherein interrupting the processing of the prioritized I/O request comprises:
      determining whether a host I/O time out value associated with the received I/O request is close to a predefined host I/O time out threshold value by the I/O control engine;
      if so, sending the prioritized I/O request to an associated disk drive in a drive tray via a plurality of solid state drive (SSD) buffer queues (SBQs) for execution by the I/O control engine; and
      if not, interrupting processing of the prioritized I/O request by the I/O control engine;
   separate the prioritized I/O request into a command I/O request or a status request; and
   send the separated command I/O request or the status request to an associated queue in the plurality of SBQs in the I/O control engine.

8. The non-transitory computer-readable storage medium of claim 7, wherein assigning the priority to the received I/O request based on the type of I/O request comprises:
   assigning the priority to the received I/O request based on priority rules/policies that are configurable by a user as a function of application and/or workload.

9. The non-transitory computer-readable storage medium of claim 7, further having instructions to:
   determine whether the assigned priority to the received I/O request has a higher priority;
   if so, send the prioritized I/O request to the associated disk drive in the drive tray via the plurality of SBQs for execution by the I/O control engine; and
   if not, send the command I/O request or status request to queue in an associated one of the plurality of SBQs by the I/O control engine.

10. The non-transitory computer-readable storage medium of claim 9, wherein determining whether the assigned priority to the received I/O request has a higher priority, comprises:
    determining whether the assigned priority to the received I/O request has a higher priority based on a look-up table by the I/O control engine.

11. The non-transitory computer-readable storage medium of claim 7, wherein the command I/O request comprises I/O request selected from the group consisting of a read I/O request and a write I/O request.

12. The non-transitory computer-readable storage medium of claim 7, wherein the status request comprises I/O request selected from the group consisting of an acknowledge request, a status request, and an error recovery level request.

13. A storage area network (SAN), comprising:
    one or more host computers;
    an environment service module (ESM), wherein the ESM comprises:
       an input/output (I/O) control engine including a plurality of solid state drive (SSD) buffer queues (SBQs); and
       one or more drive trays including disk drives coupled to the I/O control engine; and
    a RAID controller coupled between the one or more host computers and the ESM,
    wherein the I/O control engine identifies a type of I/O request upon receiving an I/O request from one of the one or more host computers,
    wherein the I/O control engine assigns a priority to the received I/O request based on the type of I/O request,
    wherein the I/O control engine interrupts processing of the prioritized I/O request,
       wherein the I/O control engine determines whether a host I/O time out value associated with the received I/O request is close to a predefined host I/O time out threshold value, interrupts processing of the prioritized I/O request if the host I/O time out value is not close to the defined host I/O time out threshold value, and sends the prioritized I/O request to associated disk drive in a drive tray via the plurality of SBQs for execution by the I/O control engine if the host I/O time out value is close to the defined host I/O time out threshold value,
    wherein the I/O control engine separates the prioritized I/O request into a command I/O request or a status request, and
    wherein the I/O control engine sends the command I/O request or status request to associated queues in the plurality of SBQs in the I/O control engine.

14. The SAN of claim 13, wherein the I/O control engine further comprises:
    a frame identification logic engine;
    a priority rules/policies engine and timer;
    a direct memory access (DMA) interrupt logic engine coupled to the priority rules/policies engine and timer and the frame identification logic engine;
    an I/O path logic engine coupled to the frame identification logic engine and the DMA interrupt logic engine;
    a status path module coupled to the I/O path logic engine;
    a command path module coupled to the I/O path logic engine, wherein the status path module and the command path module are communicatively coupled to the plurality of SBQs and associated drive channels; and
    a plurality of drive trays coupled to the associated drive channels, wherein the frame identification logic engine identifies the type of I/O request upon receiving the I/O request from one of the one or more host computers via the RAID controller, wherein the priority rules/policy engine and timer assigns the priority to the received I/O request based on the type of I/O request, wherein the DMA interrupt logic engine interrupts processing of the prioritized I/O request based on the type of I/O request, wherein the I/O path logic engine splits the prioritized I/O request into the command I/O request or the status request, and wherein the command path module and the status path module sends the command I/O request and the status request, respectively, to associated SBQs.

15. The SAN of claim 14, wherein the time associated with the priority rules/policies engine and timer determines whether the host I/O time out value associated with the received I/O request is close to the predefined host I/O time out threshold value, wherein the DMA interrupt logic engine interrupts processing of the prioritized I/O request if the host I/O time out value is not close to the defined host I/O time out threshold value, and wherein the I/O path logic engine sends the prioritized I/O request to the associated disk drive in the drive tray via the plurality of SBQs for execution by the I/O control engine if the host I/O time out value is close to the defined host I/O time out threshold value.

16. The SAN of claim 14, wherein the priority rules/policies engine and timer assigns the priority to the received I/O request based on priority rules/policies that are configurable by a user as a function of application and/or workload.

17. The SAN of claim 16, wherein the I/O path logic engine determines whether the assigned priority to the received I/O request has a higher priority, wherein the I/O path logic engine sends the prioritized I/O request to an associated disk drive in the drive tray via the plurality of SBQs for execution by the I/O control engine if the assigned priority to the received I/O request has the higher priority, and wherein the I/O path logic engine sends the command I/O request or status request to respective queues in one of the plurality of SBQs by the I/O control engine if the assigned priority to the received I/O request does not have a higher priority.

18. The SAN of claim 17, wherein the priority rules/policies engine and timer determines whether the assigned priority to the received I/O request has a higher priority based on a look-up table.

\* \* \* \* \*